(12) United States Patent
Schieblich

(10) Patent No.: US 7,423,586 B2
(45) Date of Patent: Sep. 9, 2008

(54) ANTENNAS ARRAY CALIBRATION ARRANGEMENT AND METHOD

(75) Inventor: Christian Schieblich, Ulm (DE)

(73) Assignee: Siemens Aktiengesellschaft, Munich (DE)

( * ) Notice: Subject to any disclaimer, the term of this patent is extended or adjusted under 35 U.S.C. 154(b) by 100 days.

(21) Appl. No.: 10/566,357

(22) PCT Filed: Jun. 21, 2004

(86) PCT No.: PCT/EP2004/051185

§ 371 (c)(1), (2), (4) Date: Jan. 30, 2006

(87) PCT Pub. No.: WO2005/015771

PCT Pub. Date: Feb. 17, 2005

(65) Prior Publication Data

US 2006/0192710 A1    Aug. 31, 2006

(30) Foreign Application Priority Data

Jul. 30, 2003    (EP) ................... 03017292

(51) Int. Cl.
*H01Q 3/26* (2006.01)
*H04B 17/00* (2006.01)

(52) U.S. Cl. ................ 342/368; 342/372; 342/373; 342/374; 456/67.11

(58) Field of Classification Search .......... 342/368, 342/372–374, 442

See application file for complete search history.

(56) References Cited

U.S. PATENT DOCUMENTS

| 5,546,090 | A   |     | 8/1996  | Roy, III et al. |
|-----------|-----|-----|---------|-----------------|
| 6,236,839 | B1  |     | 5/2001  | Gu et al.       |
| 6,352,542 | B1  |     | 3/2002  | Snyder          |
| 6,480,153 | B1  | *   | 11/2002 | Jung et al. ................... 342/368 |
| 6,847,327 | B2  | *   | 1/2005  | Ylitalo ........................ 342/407 |
| 6,992,622 | B1  | *   | 1/2006  | Chiang et al. ............... 342/374 |

FOREIGN PATENT DOCUMENTS

| EP  | 1 329 983 A2   | 7/2003  |
| WO  | WO 99/57820    | 11/1999 |
| WO  | 03/021287      | 3/2003  |

OTHER PUBLICATIONS

International Search Report for International Application No. PCT/EP2004/051185; mailed Dec. 30, 2004.
European Search Report for Application No. 03017292.8 mailed Mar. 4, 2004.

\* cited by examiner

*Primary Examiner*—Dao L Phan
(74) *Attorney, Agent, or Firm*—Staas & Halsey LLP

(57) ABSTRACT

In a radio communications system, a plurality of transceivers are each connected to one element of an array of antenna elements. In addition, at least one of the transceivers is additionally connected to a calibration antenna for transmitting or receiving test signals via the antenna elements. At least one calibration processor is provided for determining variations of the test signals in the transceivers. A beamforming processor is provided for taking into account the determined variations for beamforming or determination of direction of arrival of respectively transmitted and received radio signals by the antenna elements.

16 Claims, 8 Drawing Sheets

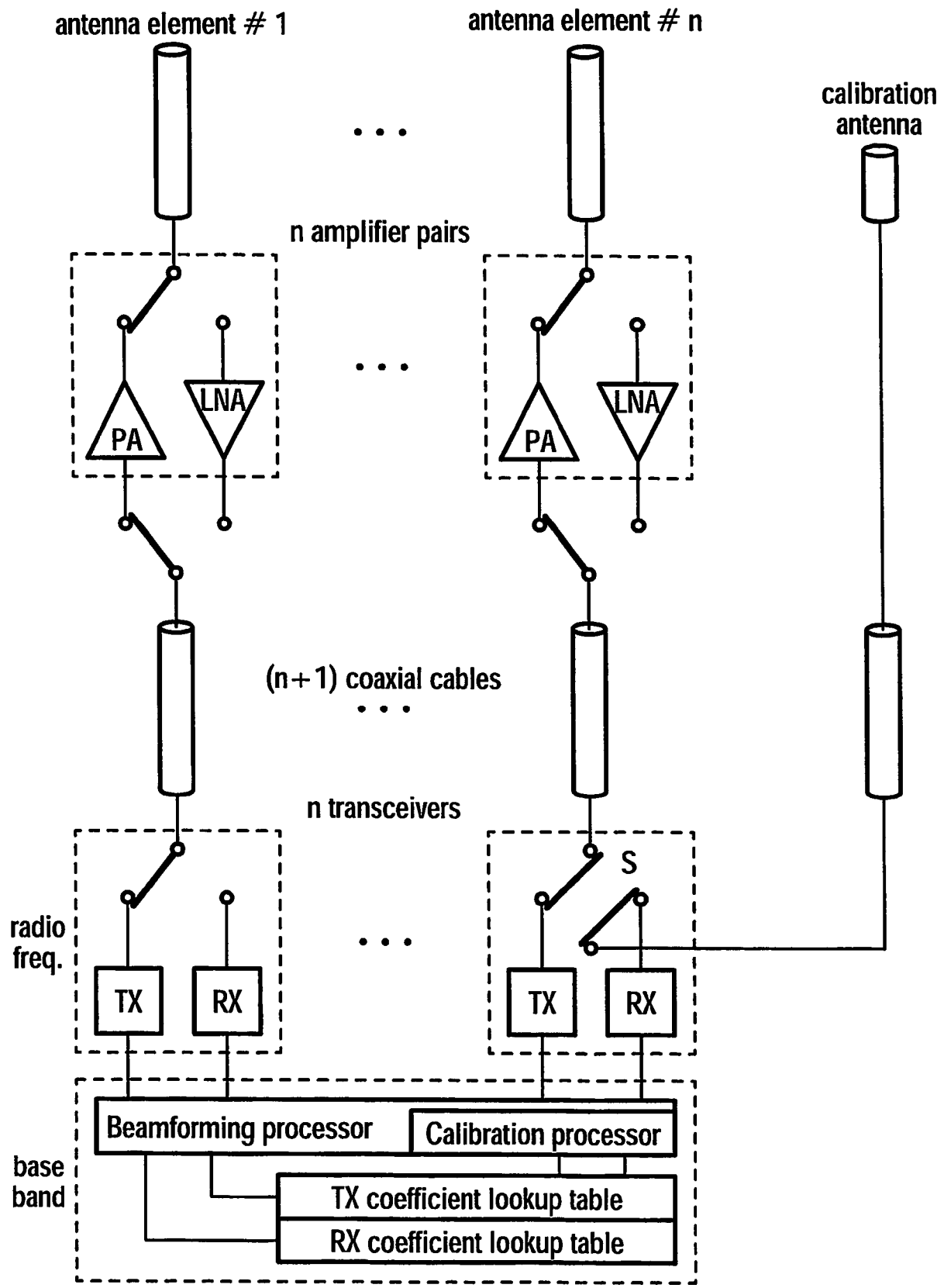

ANTENNAS ARRAY CALIBRATION ARRANGEMENT AND METHOD

CROSS REFERENCE TO RELATED APPLICATIONS

This application is based on and hereby claims priority to European Application No. 03017292 on Jul. 30, 2003, the contents of which are hereby incorporated by reference.

BACKGROUND OF THE INVENTION

1. Field of the Invention

The invention relates to an apparatus and a method for controlling transmission and/or reception of signals in a radio communication system, especially for application in base stations of mobile radio communications systems.

2. Description of the Related Art

In radio communications systems, signals are exchanged between radio terminals and base stations via a so called radio interface or air interface. Radio terminals are in general mobile or stationary user terminals (UE—user equipments), whereas base stations (NB—Node B) are access stations associated with a land based communication network. Examples of known radio communication systems are second generation digital mobile radio communications systems like GSM (Global System for Mobile Communication) based on TDMA (Time Division Multiple Access) and providing data rates up to 100 kbit/s, and third generation digital mobile radio communications systems like UMTS (Universal Mobile Telecommunication System) based on CDMA (Code Division Multiple Access) with data rates up to 2 Mbit/s.

Antenna arrays can be used in any type of system that transmits and/or receives radio frequency signals using one or a plurality of antennas. The use of antenna arrays in above described systems provides for antenna performance improvements over the use of a single element antenna, including improved directionality, signal to noise ratio and interference rejection for received signals, as well as improved directionality, security, and reduced power requirements for transmitted signals. Antenna arrays can be used for signal reception only, for signal transmission only, or for both signal reception and transmission. Most antenna array systems consist of an antenna array and a signal processor that processes the signals going to and coming from individual array elements.

Thus, an antenna array is composed of a number of so called antenna elements, each connected to a radio frequency (RF) transceiver (transmitter/receiver). In reception mode, the receivers obtain RF signals from each antenna element and apply a down conversion of the received signals to base band signals. In the base band, demodulated signals are then compared with each other in amplitude and phase. The information on the direction of arrival (DOA) of the incoming signal, i.e. the direction of the transmitting station, is contained in the relationship between the received signals. In transmission mode, this information is subsequently used for beamforming (BF) in the direction of the received signal by correctly weighting base band signals for the different transmitters connected to the antenna elements.

The procedure described above can only be realized with a certain accuracy if the characteristics of the individual transmitters and receivers are known, so that these characteristics can be taken into account for the DOA and BF algorithms. To be precise, transfer functions (in amplitude and phase) from antenna elements to the base band outputs of the receivers as well as transfer functions from the base band inputs of the transmitters to the antenna elements must be known. During operation these transfer functions are subject to parameter variations (drift) of active and passive elements in the transceivers and cables. Therefore, transfer functions have to be continuously or at least periodically determined during operation of the transceivers.

Two different approaches of calibration procedures are known in the art. According to a first procedure, a known signal is fed to a test antenna (calibration antenna) which is arranged close to or as part of the antenna array (known from U.S. Pat. No. 6,236,839) or is separated from the antenna array (known from U.S. Pat. No. 5,546,090). The base band signals carry information about the transfer functions of the individual receiver paths, which can then be compared and adjusted. This procedure is called RX calibration.

According to a second procedure, known signals are fed to the individual antenna elements and received by a test antenna. The test antenna could thereby be located as described above.

The received signals carry the information about the individual transfer functions of the transmitter paths, which are subsequently compared and adjusted. This procedure is called TX calibration.

Both calibration procedures can be realized either simultaneously, which is a preferred solution in systems using frequency division duplex (FDD), or consecutively as preferred in systems using time division duplex (TDD).

Configurations enabling the above described procedures are shown in FIGS. 2 and 3. According to these configurations, a calibration antenna is connected by a duplexer or switch to calibration transmitter (TXc) and receiver (RXc) circuits operating in the radio frequency range. Signals from/to the calibration antenna are processed in a calibration processor operating in the base band. The calibration processor is connected to a beamforming processor that processes signals from/to the individual antenna elements (#1 . . . #n) of an antenna array of e.g. a base station. Coefficients representing the determined variations are stored in lookup tables.

In a RX calibration procedure (FIG. 2, the signal flow is presented by broken lines), the calibration processor initiates the transmission of test signals from the calibration antenna over the air interface to the individual antenna elements of the antenna array. The received test signals are then fed back to the calibration processor by the beamforming processor. Within the calibration processor, transfer functions of the individual receiver paths are determined and evaluated and stored in a lookup table in order to be taken into account for normal operation of determining directions of arrival.

In a TX calibration procedure (FIG. 3, the signal flow is presented by broken lines), the calibration processor initiates the transmission of test signals from each of the antenna elements which are received by the calibration antenna. The received signals containing information about the transfer functions of the individual transmitter paths are then evaluated in the calibration processor and stored in a lookup table in order to be taken into account for the normal operation of beamforming.

The described procedures suffer from the fact that specialized calibration means have to be integrated within each base station, thereby causing additional costs and space requirements.

It is therefore an object of the invention to provide calibration arrangements which do no suffer from the above stated disadvantages.

SUMMARY OF THE INVENTION

According to a first and second aspect of the invention, an arrangement and a method for controlling transmission and/or reception of signals in a radio communication system is provided. The arrangement thereby includes transceiving means and antenna elements, wherein at least one of the transceiving means is additionally connected to a calibration antenna. The arrangement furthermore includes a calibration processor for determining variations of the test signals in the transceiving means, and a beamforming processor for taking into account the determined variations for beamforming and/or determination of direction of arrival of respectively transmitted and received radio signals by the antenna elements.

The usage of transceiving means normally used for transmission and reception of radio signals to/from other radio stations for transmitting and/or receiving test signals via a calibration antenna in calibration procedures allow the saving of additional space and costs required for separate calibration transceiving means used in the prior art.

BRIEF DESCRIPTION OF THE DRAWINGS

These and other aspects and features of the present invention will become more apparent and more readily appreciated from the following description of the preferred embodiments, taken in conjunction with the accompanying drawings of which:

FIG. 7 is a block diagram of the arrangement according to the invention with additional amplifiers arranged close to the antenna elements.

DETAILED DESCRIPTION OF THE PREFERRED EMBODIMENT

Figure 1:
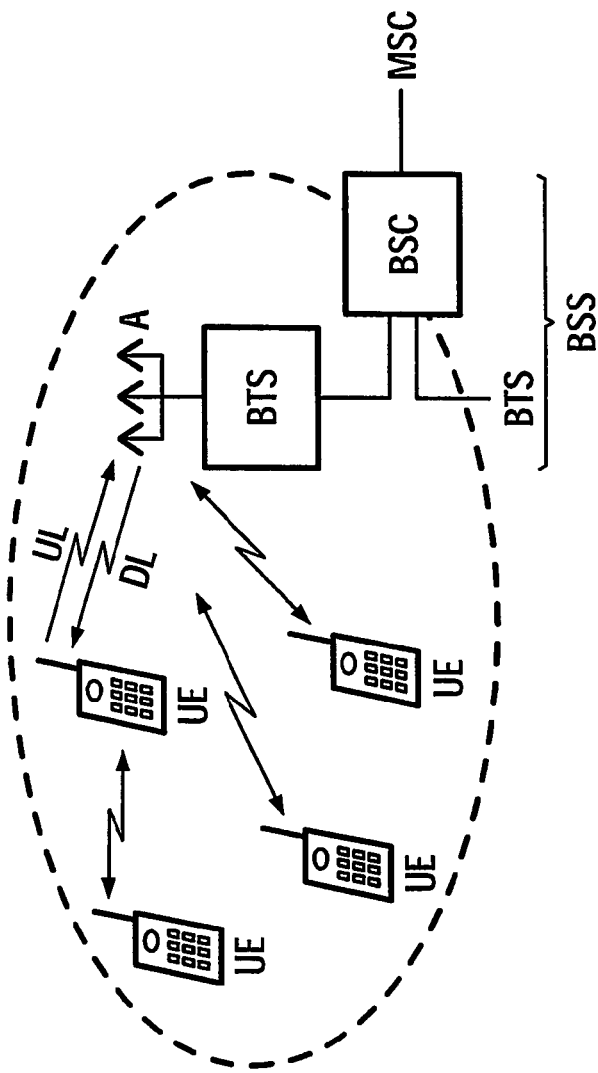
FIG. 1 is a block diagram of a radio communication network.

Reference will now be made in detail to the preferred embodiments of the present invention, examples of which are illustrated in the accompanying drawings, wherein like reference numerals refer to like elements throughout.

FIG. 1 shows the basic structure of a mobile radio communications system, e.g. a GSM system. The system includes a central mobile switching center MSC which is connected to the public switched telephone network PSTN and other MSCs. Connected to a MSC are a plurality of base station controllers BSC, which inter alia coordinate the sharing of radio resources provided by base stations BTS (Base Transceiver Station). Base stations BTS transmit in downlink DL and receive in uplink UL signals respectively to or from user equipments UE situated within an area covered by the base station BTS. In FIG. 1 the base station BTS has an antenna array A having a number of antenna elements. The antenna array, which depending on the configuration is sometimes also called smart antenna, is used for beamforming of signals transmitted to individual user equipments in order to reduce interference caused to signal transmissions of parallel connections to other user equipments.

Figure 2:
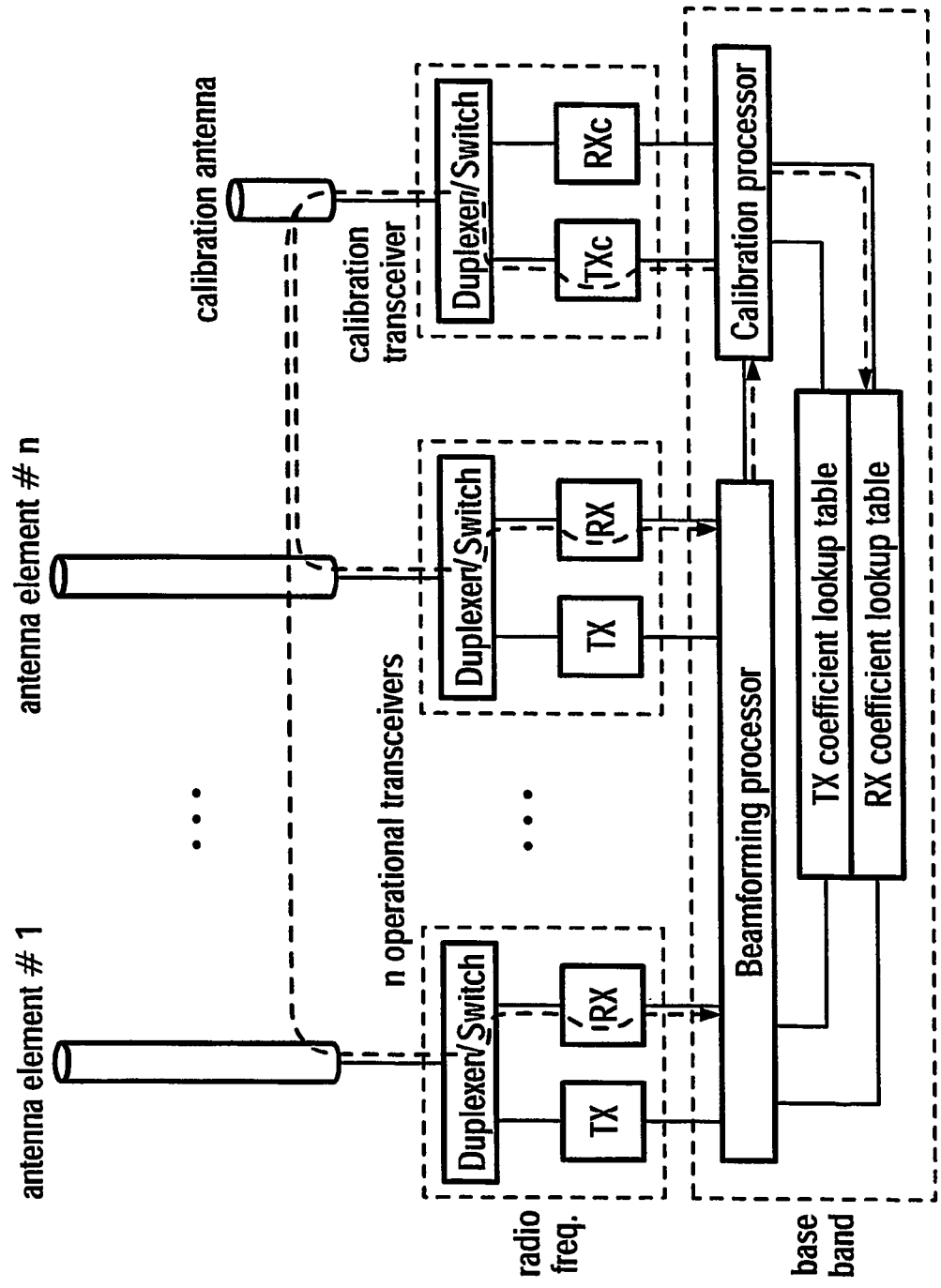
FIG. 2 is a block diagram showing signal flow for RX calibration in an arrangement known in the art.
Figure 3:
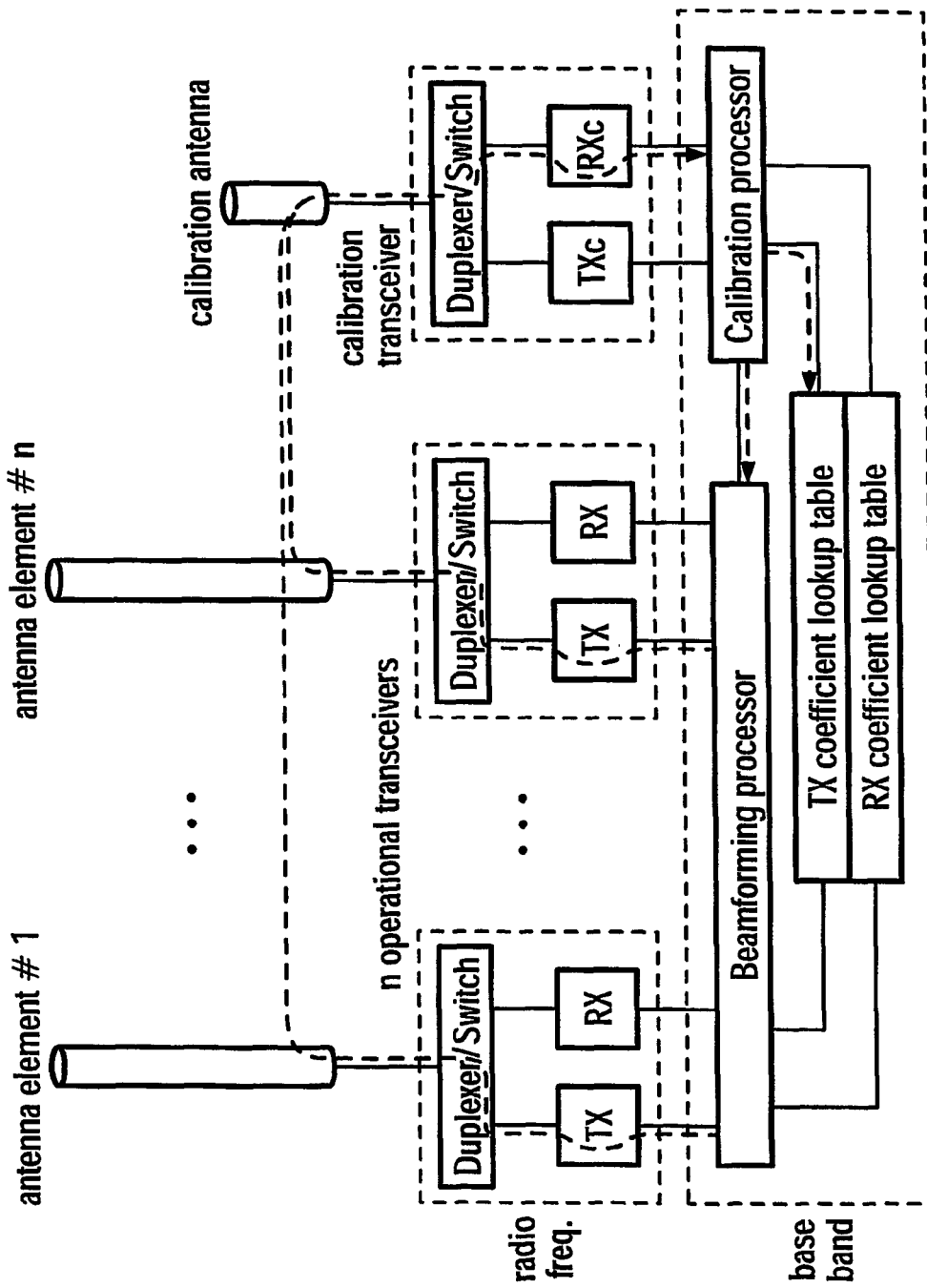
FIG. 3 is a block diagram showing further signal flow for TX calibration in an arrangement known in the art.
Figure 4:
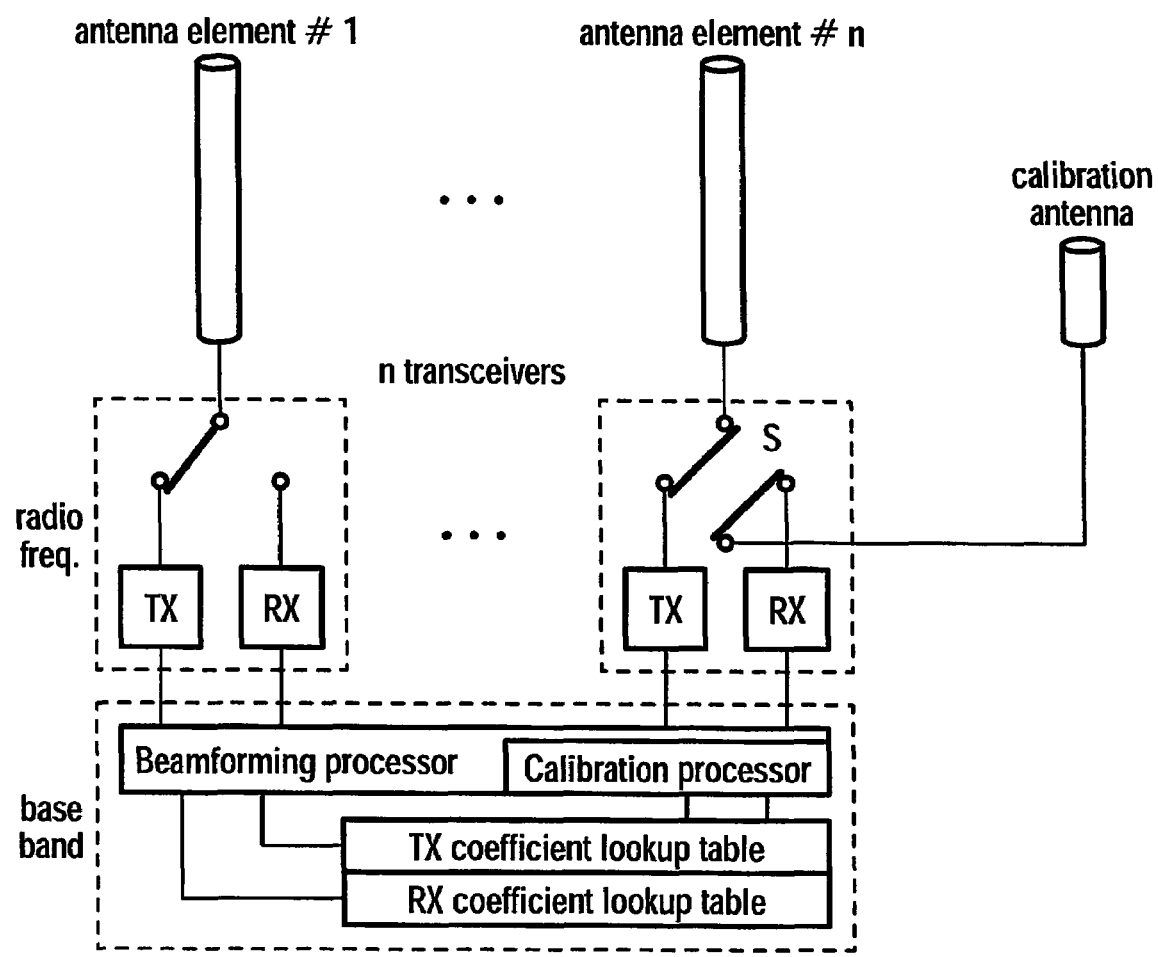
FIG. 4 is a block diagram of an arrangement according to the invention in a TX calibration procedure.
Figure 5:
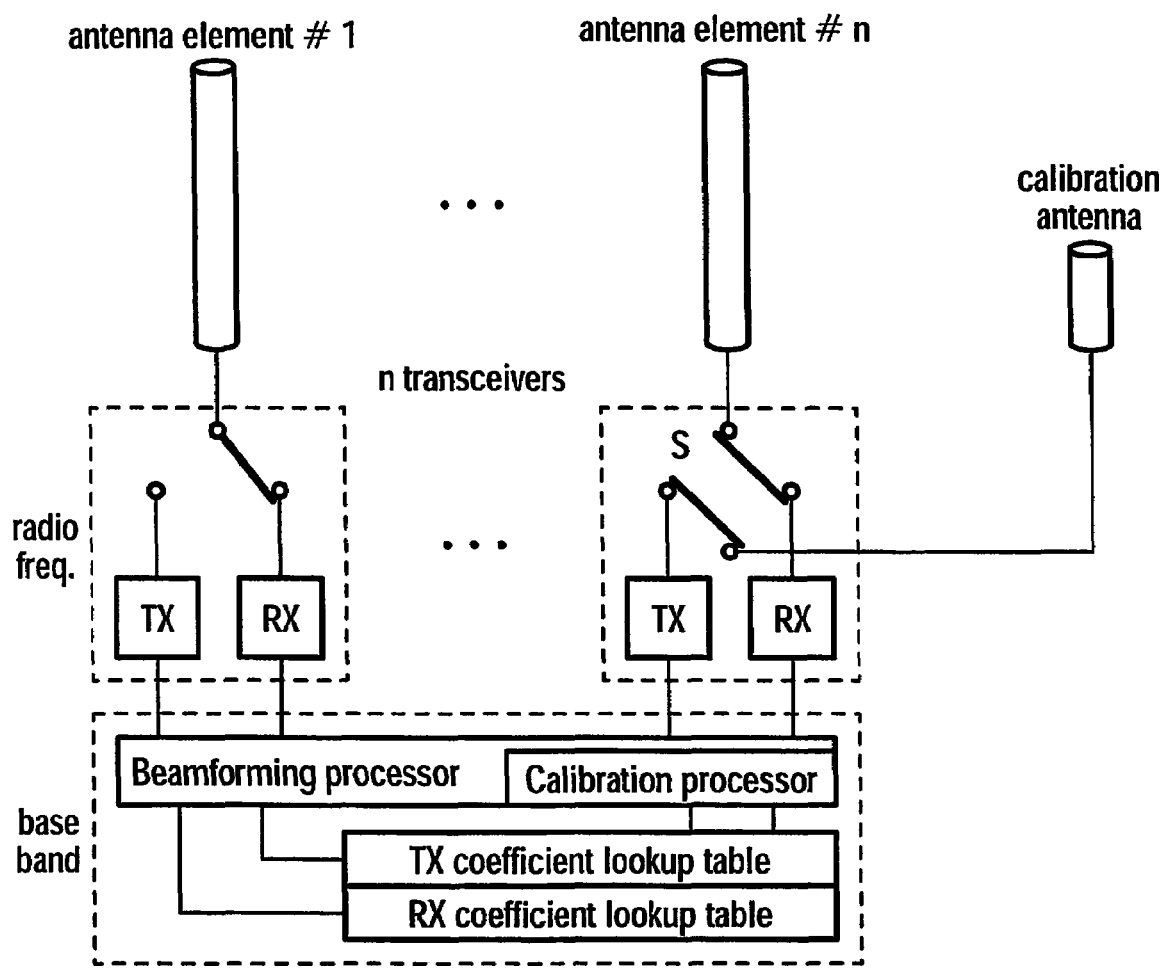
FIG. 5 is a block diagram of the arrangement according to the invention in a RX calibration procedure.

An arrangement according to the invention as shown in FIGS. 4 and 5 is based on the structure of FIGS. 2 and 3 described above. In contrast to arrangements known in the art, one of the transceiving means TX, RX is not only connected to one of the individual antenna elements #1 . . . #n, but also to a calibration antenna via a switch S. In a calibration procedure, test signals are switched to/from the calibration antenna, whereas in normal operation, signals are transmitted and/or received via the antenna element connected to the transceiving means. The switch is realized in the radio frequency in any possible way known to the expert.

In the following, RX and TX calibration procedures using arrangements according to the invention are described with reference to FIGS. 4 to 9. These procedures can be realized continually or periodically during operation of the transceivers.

In a RX calibration procedure, i.e. calibration of the receiving paths of the transceivers, the calibration processor or an individual source generates test signals in the base band, which are converted into radio frequency band signals by a transmitter TX (in FIG. 4 the transmitter on the right hand side) and fed to the calibration antenna via a switch S. After transmission over the air interface, the test signals are received by the individual antenna elements #1 . . . #n and downconverted in the individual receivers RX into base band signals again. The beamforming processor connected to the transceiving means provides the received signals that contain information about transfer functions of the individual signal paths to the calibration processor, in which the differences in receiver characteristics are determined. Information about the determined differences are then stored in a RX coefficient lookup table and fed back to the beamforming processor in order to be taken into account for normal operation of determining directions of arrival of radio signals from user equipments in communication with the base station. As coefficients, e.g. maxima of phase and amplitude differences of coupling coefficients are determined by the calibration processor.

It can be seen from FIG. 4 that the arrangement according to the invention makes simultaneous use of the transmitting as well as the receiving path of the transceiver on the right hand side.

In a TX calibration procedure, i.e. the calibration of the transmitting paths of the transceivers, the calibration processor or an individual source generates base band test signals that are fed to the transmitting means TX of the transceivers via the beamforming processor. The calibration processor is thereby realized within the beamforming processor or as a separated unit that is connected to the beamforming processor.

The test signals are upconverted into radio frequency band signals by the transmitting means TX and fed to the individual antenna elements #1 . . . #n. After transmission over the air interface, the test signals are received by the calibration antenna, fed to the receiver RX via a switch S and downconverted in the receiver RX again into base band signals. From these received test signals, the calibration processor determines differences in transmitter characteristics and stores information about the determined differences in a TX coefficient lookup table in order to be taken into account for normal operation of beamforming of radio signals to user equipments by the beamforming processor. As coefficients e.g. maxima of phase and amplitude differences of coupling coefficients are determined by the calibration processor.

Figure 6:
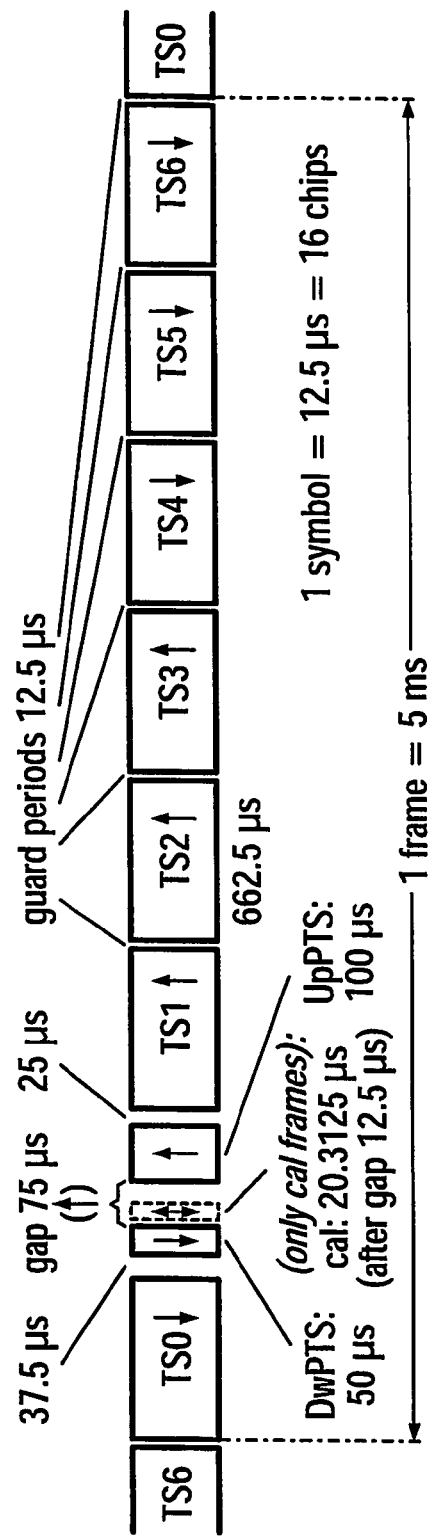
FIG. 6 is a data diagram of the structure of a time frame of a TDD radio communication system.

FIG. 6 shows the structure of a time frame of a TDD (Time Division Duplex) system known from the third generation UMTS TDD-LCR (TDD-Low Chip Rate) standard and the Chinese TD-SCDMA standard. The time frame consists of seven timeslots TS0 ... TS6 which are allocated either in uplink (↑), i.e. from the user equipments to the base station, or in downlink (↓), i.e. from the base station to the user equipments. After the first timeslot TS0, which according to the standard is always used for downlink transmission, a first switching point is provided with a special downlink pilot timeslot DwPTS, uplink pilot timeslot UpPTS and an extended guard period gap in between. According to the invention, this extended guard period gap is partly or entirely used for the transmission of test signals (in a so called cal frame) for RX and TX calibration. As an advantage, the usage of the extended guard period for the transmission and reception of calibration test signals reduces neither the overall transmission capacity of the time frame nor the performance of the system.

A further arrangement according to the invention is disclosed in FIG. 7. In this case, power amplifiers PA, LNA operating in the radio frequency range are arranged close to the antenna elements #1 ... #n and normally mounted on a tower remote from the base station. These power amplifiers are often called tower mounted amplifiers. The connection between the remote power amplifiers and the transceivers located in the base station is realized e.g. by individual coaxial cables as shown in FIG. 7. Accordingly, also the calibration antenna arranged close to the antenna elements is connected to one of the transceivers via a coaxial cable. It is not necessary to provide separate power amplifiers for the transmission and reception of test signals since the required transmission power is restricted and could be easily provided by the transmitter TX in the transceiving means. Moreover, the loss of the coaxial cables does not have any negative influence on the measurements in general and e.g. noise figures of the receiver. In this configuration, transmitting and receiving paths variations taking into account all receiving and transmitting means can be determined in the calibration processor.

Because the transceiving means TX, RX only operate in a single frequency band at a time, the TX calibration procedure is configured in that the calibration processor controls the transmitting means TX in that only one transmitting mean TX transmits test signals to the calibration antenna at a time in order to separate the received signals of the individual transmitting means TX in time. With reference to FIG. 6, e.g. different transmitting means TX transmit consecutively test signals in the transmission gap.

In an RX calibration procedure, test signals are transmitted from the calibration antenna in a certain frequency band, received by all receiving means RX at the same time and analyzed concurrently in the calibration processor. From one time frame to another, test signals are transmitted in different frequency bands in order to calibrate the transmission and/or reception paths for all carriers used.

Figure 8:
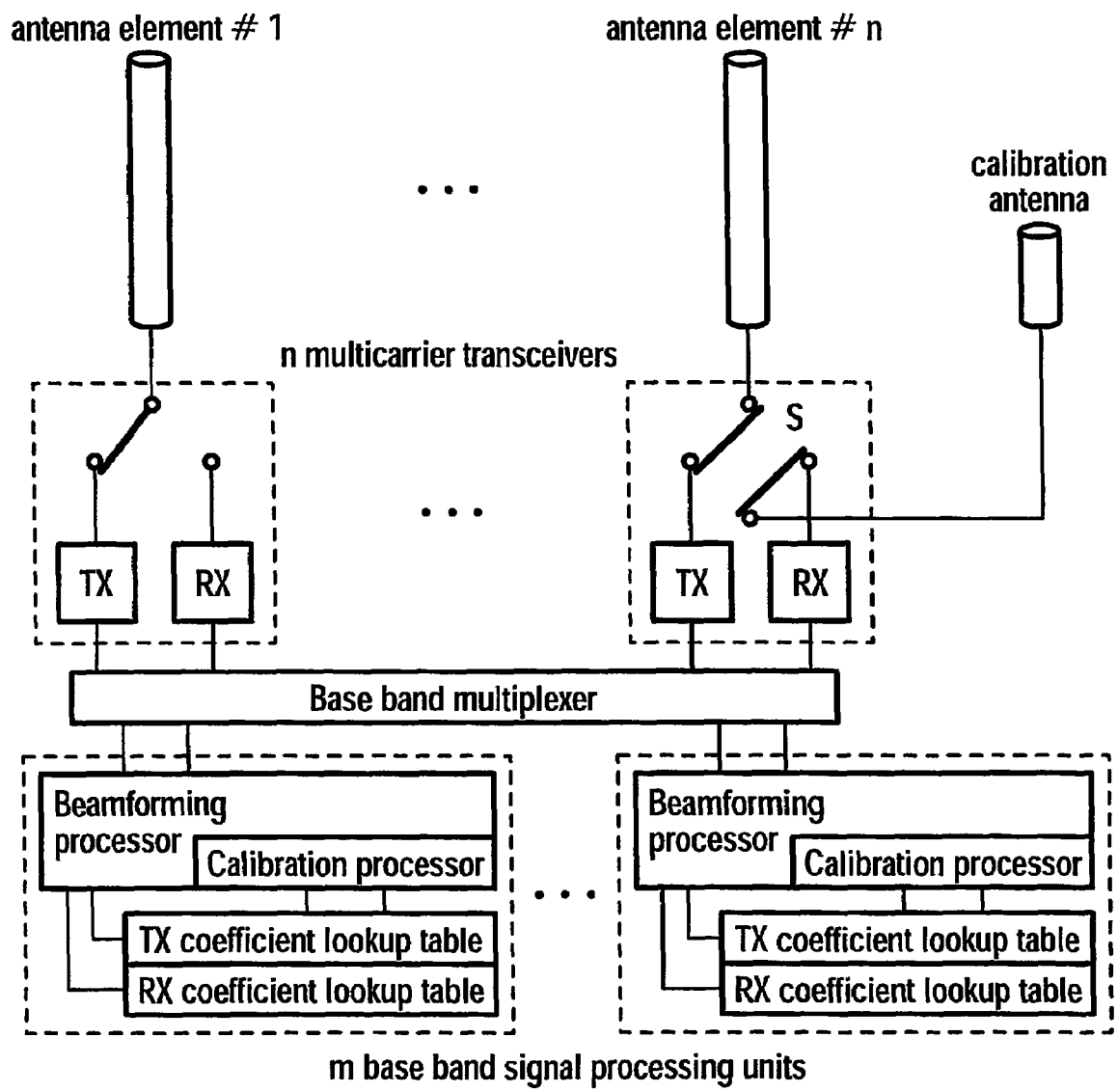
FIG. 8 is a block diagram of the arrangement according to the invention with a plurality of calibration processors for simultaneous calibration in different radio frequency bands.

Since the realization of TX and RX calibration procedures for a plurality of frequency bands would require the usage of a large number of consecutive time frames, FIG. 8 discloses a further implementation alternative. Instead of just one calibration processor and corresponding lookup tables for storing determined coefficients, a number m of base band signal processing units are realized and connected to the transceiving means TX, RX e.g. via a base band multiplexer. Preferably, the number of base band signal processing units, including inter alia beamforming and calibration processors as well as lookup tables, is chosen according to the number of frequency bands in which the multicarrier transceivers operate.

The usage of a plurality of base band signal processing units enables the application of simultaneous calibration procedures in a number of frequency bands. This could be realized in that the transceivers TX, RX process m carriers simultaneously and the corresponding base band signals are multiplexed to different signal processing units, each operating for a particular frequency band. The signal processing units then realize a calibration for the individual frequency bands of the corresponding carriers.

In a TX calibration procedure, test signals in different frequency bands are transmitted concurrently by a number or all transceivers, e.g. dependent on the number of base band signal processing units. These test signals are received by the calibration antenna and receiving path of one of the transceivers, and multiplexed to the individual processing units for the different frequency bands. From one calibration procedure to another, the individual transceivers use different frequencies for the transmission of the test signal, so that characteristics of each transmitting path can be analyzed for each frequency band in a relatively short time.

In a RX calibration procedure, test signals are transmitted via the calibration antenna and received by the individual receiving paths of the transceivers. For each frequency band or carrier used for transmission of test signals, one of the calibration processors determines individual variations of the characteristics of the receiving paths.

Figure 9:
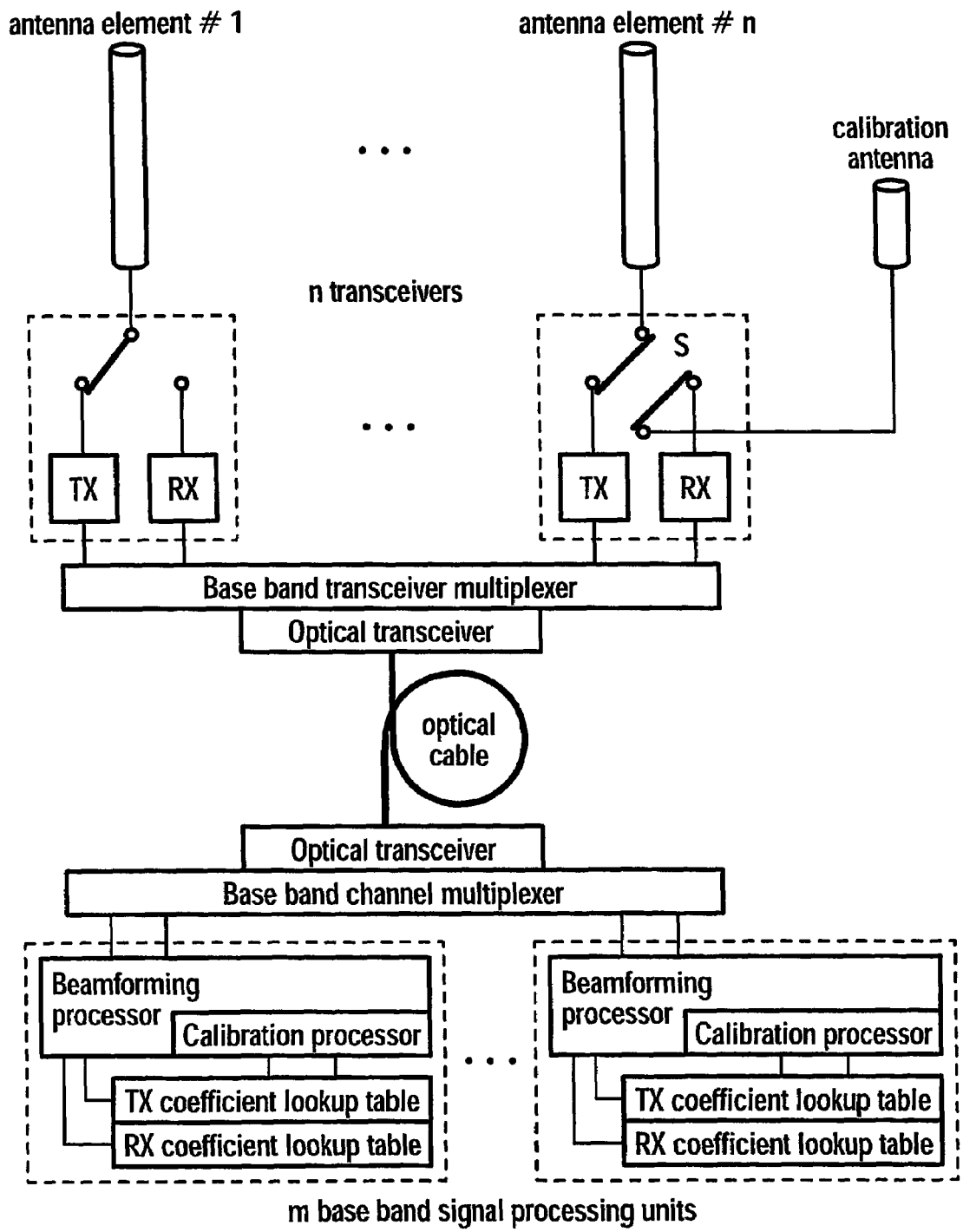
FIG. 9 is a block diagram showing the arrangement of FIG. 8 with an optical link connection between multiplexer means.

According to another alternative implementation of the inventive arrangement shown in FIG. 9, the base band signal processing units are connected to n remote transceivers via an optical link. This optical link arrangement could equally be used instead of coaxial cables described with reference to FIG. 7. In the case of FIG. 9, the base band multiplexer described with reference to FIG. 8 is divided into a base band transceiver multiplexer arranged close to the tower mounted transceivers and antenna elements, and a base band channel multiplexer arranged close to the base band signal processing units, preferably in the base station. The optical link is thereby realized by optical transceivers connected to the multiplexers and one or a plurality of optical cables. Advantage of the use of optical links instead of coaxial cables are e.g. that a smaller number of cables have to be installed for the connection between the base station and the remote, tower mounted transceivers and antenna elements, and that less insertion losses occur.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A system for controlling at least one of transmission and reception of signals in a radio communication system having a calibration antenna and an array of antenna elements, comprising:

a plurality of transceiving means, each connected to one element of the array of antenna elements, at least one of said transceiving means additionally connected to the calibration antenna, for at least one of transmitting and receiving test signals via the antenna elements;

at least one calibration processor determining variations of the test signals in said transceiving means; and a beamforming processor taking into account the variations determined by said calibration processor for at least one of beamforming and determination of direction of arrival of radio signals respectively transmitted and received by the antenna elements.

2. A system according to claim 1, wherein a transmission gap in a time frame of a time division duplex system is used for transmission of the test signals for determining variations in said calibration processor.

3. A system according to claim 2, wherein in said at least one transceiving means connected to the calibration antenna test signals are switched via a switch to the calibration antenna in a calibration process.

4. A system according to claim 3, wherein said calibration processor is realized within said beamforming processor.

5. A system according to claim 4, further comprising at least one lookup table storing information related to the variations of the test signals.

6. A system according to claim 5,
further comprising a base band multiplexer connected to said transceiving means, and
wherein said at least one calibration processor includes at least two calibration processors, each determining variations for a different radio frequency, connected to said transceiving means via said base band multiplexer.

7. A system according to claim 1, further comprising a base station of the radio communication system, in which said transceiving means, said at least one calibration processor and said beamforming processor are located.

8. A method for controlling at least one of transmission and reception of signals in a radio communication apparatus having transceivers, each connected to one element of an array of antenna elements, at least one of the transceivers being additionally connected to a calibration antenna, said method comprising:
at least one of a receiver calibration procedure and a transmitter calibration procedure, the receiver calibration procedure including:
generating test signals,
feeding the test signals to the at least one of the transceivers connected to the calibration antenna,
transmitting the test signals via the calibration antenna,
receiving the test signals by the antenna elements and corresponding transceivers,
determining, in at least one calibration processor, reception variations of the test signals in the transceivers, and
taking into account the reception variations, determined in the at least one calibration processor, for determination of direction of arrival of respectively received radio signals by the antenna elements; and
the transmitter calibration procedure including
generating the test signals,
feeding the test signals to the transceivers,
transmitting the test signals via the antenna elements,
receiving the test signals by the calibration antenna and the at least one of the transceivers connected thereto,
determining, in the at least one calibration processor, transmission variations of the test signals in the transceivers, and
taking into account the transmission variations, determined in the at least one calibration processor, for beamforming of respectively transmitted radio signals from the antenna elements.

9. A method according to claim 8, wherein at least one of the reception and transmission variations of the test signals are determined consecutively for different radio frequencies.

10. A method according to claim 9, wherein at least one of the reception and transmission variations of the test signals are determined concurrently for different radio frequencies, using individual calibration processors for the different radio frequencies.

11. A method according to claim 10, further comprising determining transfer functions of at least one of transmitting and receiving paths in the calibration processor.

12. A method according to claim 11, further comprising determining a maximum of a phase and amplitude difference of a coupling coefficient in each calibration processor.

13. A method for controlling at least one of transmission and reception of signals in a radio communication apparatus having communication transceivers, respectively connected to an array of antenna elements, and a calibration transceiver connected to a calibration antenna, said method comprising:
at least one of a receiver calibration procedure and a transmitter calibration procedure, the receiver calibration procedure including:
generating test signals,
feeding the test signals to the calibration transceiver,
transmitting the test signals via the calibration antenna,
receiving the test signals by the antenna elements and corresponding communication transceivers,
determining, in at least one calibration processor, reception variations of the test signals in the communication transceivers, and
taking into account the reception variations, determined in the at least one calibration processor, for determination of direction of arrival of respectively received radio signals by the antenna elements; and
the transmitter calibration procedure, including
generating the test signals,
feeding the test signals to the communication transceivers,
transmitting the test signals via the antenna elements in a transmission gap in a time frame of a time division duplex system,
receiving the test signals by the calibration antenna and the calibration transceiver,
determining, in the at least one calibration processor, transmission variations of the test signals in the communication transceivers, and
taking into account the transmission variations, determined in the at least one calibration processor, for beamforming of respectively transmitted radio signals from the antenna elements.

14. A radio communication system for controlling at least one of transmission and reception of radio signals, having a calibration antenna and an array of antenna elements, comprising:
a plurality of transceivers, each connected to one antenna element of the array of antenna elements, at least one transceiver additionally connected to the calibration antenna via which the at least one transceiver transmits first test signals from the calibration antenna to the antenna elements and/or receives second test signals transmitted from the antenna elements to the calibration antenna;
at least one calibration processor determining variations of at least one of the first and second test signals; and
a beamforming processor taking into account the variations determined by said at least one calibration processor in performing at least one of beamforming and determination of a direction of arrival of the radio signals respectively transmitted and received by the antenna elements.

15. A method according to claim 14, wherein the calibration antenna sends or receives only test signals and communicates to the at least one calibration processor via the at least one of said transceiving means.

16. A method for controlling at least one of transmission and reception of signals in a radio communication apparatus having transceivers, each transceiver being connected to one element of an array of antenna elements, at least one of the transceivers being additionally connected to a calibration antenna, said method comprising:

at least one of a receiver calibration procedure and a transmitter calibration procedure, the receiver calibration procedure including:

generating test signals, feeding the test signals to the at least one of the transceivers connected to the calibration antenna, transmitting the test signals via the calibration antenna, receiving the test signals by each antenna element of the array of antenna elements and each corresponding transceivers, determining, in at least one calibration processor, reception variations of the test signals received in the transceivers of each antenna element, and taking into account the reception variations, determined in the at least one calibration processor, for determination of a direction of arrival of radio signals received by any antenna element of the array of antenna elements; and the transmitter calibration procedure, including generating the test signals, feeding the test signals to the transceivers of the antenna elements, transmitting the test signals via the antenna elements, receiving the test signals by the calibration antenna and the at least one of the transceivers connected thereto, determining, in the at least one calibration processor, transmission variations of the test signals in each of the transceivers of the antenna elements, and taking into account the transmission variations, determined in the at least one calibration processor, for beamforming of radio signals transmitted from each of the antenna elements.

\* \* \* \* \*